G. P. JACOBS & J. JAMER.
PIPE-CUTTER.

No. 179,024.  Patented June 20, 1876.

Witnesses:
Henry Eichling
H. Wells Jr

Inventor:
George P. Jacobs.
Jacob Jamer
per James A. Whitney
Atty.

UNITED STATES PATENT OFFICE.

GEORGE P. JACOBS AND JACOB JAMER, OF BROOKLYN, NEW YORK.

IMPROVEMENT IN PIPE-CUTTERS.

Specification forming part of Letters Patent No. 179,024, dated June 20, 1876; application filed March 7, 1876.

*To all whom it may concern:*

Be it known that we, GEORGE P. JACOBS and JACOB JAMER, both of Brooklyn, in the county of Kings and State of New York, have invented an Improvement in Pipe-Cutters, of which the following is a specification:

This invention relates to that class of devices used for cutting iron pipes and cylindric rods, &c.

The said invention comprises a novel combination, with a square-socketed stock, of a rotating sleeve, feeding-screw, feeding-nut, cutter, guide-slot, and circular rest, the whole so constructed and arranged as to provide for the convenient and effective feeding of the cutter to the pipe or rod to be severed, and also to permit adjustment of the implement for the cutting of pipes, rods, &c., of different diameters, the construction of the implement being, moreover, such as to permit, by a slight substitution of parts, its use as a threading-die or screw-stock.

The invention further comprises the combination, with the square-socketed stock and adjustable cutter, of a square holder for the pipe-rest, the said holder being made in two parts, pivoted or jointed together, and provided with a lock-screw, whereby rests of different capacities or internal diameters may be readily secured in or detached from the implement, to permit the same to be used for cutting a pipe or rod of any desired diameter, the aforesaid holder being moreover recessed or slotted to permit the passage of the cutter through the same to reach and sever the pipe or rod, as the case may be.

Figure 1:
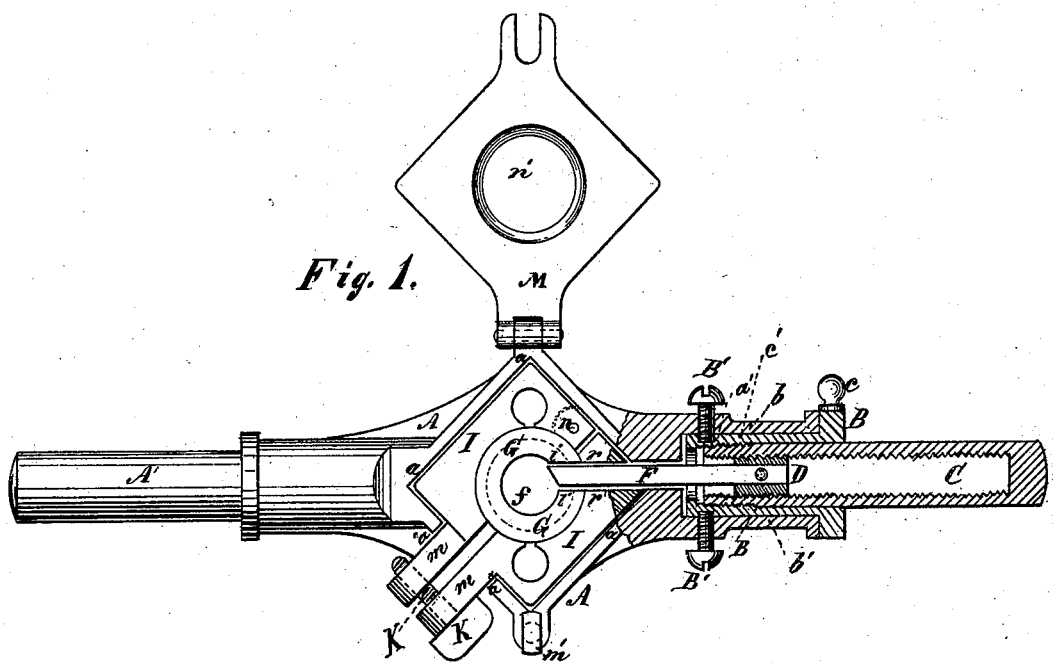
Figure 2:
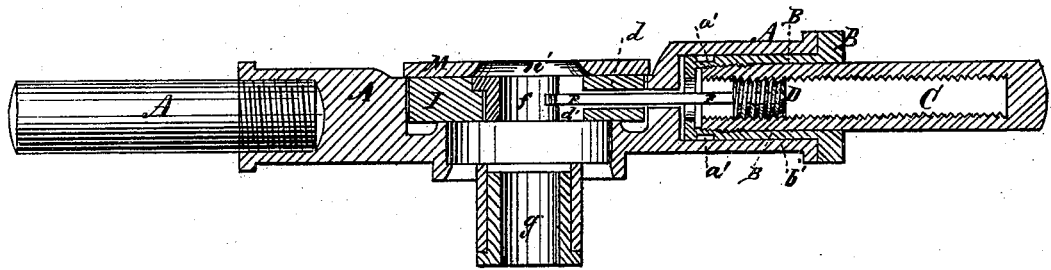

Figure 1 is a plan view and horizontal section of an implement made according to our invention. Fig. 2 is a longitudinal section of the same taken centrally and in a plane at right angles to that of Fig. 1.

A is the stock, in the center of which is a square socket, $a$. This socket $a$ has the form, proportions, and general arrangement of the corresponding socket of a well-known variety of die-stocks for cutting screw-threads. One end of the stock A is provided with a handle, A'; in the other end of said stock is a cylindric bore, $b$; in this bore is fitted an internal sleeve, B, the innermost end of which is provided with a circumferential groove, $a'$.

Screws B' are passed through the corresponding portion of the stock A, with their inner ends projecting into the groove $a'$ in such a manner as to permit the rotation of the sleeve B within the bore $b$, and, at the same time, to prevent the sleeve B from slipping longitudinally out of place. Upon the outer end of the sleeve B are radial knobs or projections $c$, which enable the sleeve to be more readily turned, as hereinafter explained. Inasmuch as, for the purposes of our invention, it is simply necessary that the sleeve be permitted to rotate witout longitudinal displacement, irrespective of the means to insure its retention in place, the groove $a'$ and screws B' may be substituted by any other suitable device for the same purpose, when preferred. Screwed into the sleeve B is an internally-screw-threaded bar or arm, C, which constitutes one handle of the implement, and which, for convenience of description, is hereinafter designated as the handle C. This handle C being firmly connected with the sleeve B, by being screwed thereto, as shown at $e'$, a rotary movement given to the sleeve B will of course be communicated to the said handle C. D is a nut working in the internally screw-threaded handle C and having attached thereto the flat cutter F, which passes through a slot or guide, $d$, formed in the adjacent solid portion of the stock A, and having a cross-section corresponding to that of the cutter F passing therethrough. The cutter F, being flat and passing through the guide $d$ of coincident shape, is kept from turning around. By giving a rotary movement to the sleeve B and, consequently to the handle C, the said handle will move the nut D in an inward or outward direction, according as the handle is turned in one direction or another. As a consequence the cutter F will be moved to or from, as the case may be, the central part of the socket $a$, the guide $d$, therefore, serving the double purpose of a guide to the cutter as it is fed in or out from its work, and of keeping the nut D from rotating, so that said nut can be moved in or out by the rotation of the handle, as just set forth. G is a circular rest, in which the pipe or rod is held while being cut or severed. The bore or central space $f$ of this rest G corresponds to the diameter of the pipe or rod to be cut, and, when in use, is coincident with the throat $g$ of the stock A, as represented in Fig. 2.

In the use of the implement it is designed to have a number of these rests G of uniform size externally, but having bores of different sizes, to accommodate different sizes of pipes or rods. This rest G is divided at one side, as shown at $i$, in order to permit the cutter F to pass in through the same, to reach and cut the pipe or rod, as the case may be. I is the holder, which holds and sustains the rest G when the latter is in use. Except as concerns the lugs $m$, hereinafter described, the holder I corresponds in shape and size with the socket $a$, in order that it may be fitted and retained therein without turning in the use and operation of the implement. This holder I is made in two parts or sections, pivoted together at one side, as shown at $n$, and connected at the opposite side by a screw, K, passing through the laterally-projecting lugs $m$.

It will be seen that, by separating the lugs $m$ by unscrewing the screw K, the two sections of the rest-holder I may be spread apart, to permit the removal and replacement of the rest G, as required, to adapt the implement to cutting any diameter of pipe or rod desired; and that, by tightening the lugs $m$ toward each other, with the rest G inclosed between the two sections of the holder I, the said rest will be held firm and rigid within the holder. The holder itself being kept from turning within the square socket $a$, the rest itself will be held in proper relation with the cutter. One side of the socket $a$ is cut away, as shown at at $a''$, to accommodate the lugs $m$. The holder I is slotted, as shown at $r$, to permit the cutter F to pass through the same, and, to and through the rest G, to and against the article to be cut or severed. The parts being constructed and disposed in the manner described are retained in place by shutting the hinge-cover M down over the socket $a$, and fastening the same in place by the button $m'$, or other suitable holding device, said cover M having a circular orifice, $n'$, at its center, to permit the article to be cut to be thrust through the same in the use of the implement. In such use the pipe or rod, as the case may be, is thrust through the throat $g$ and through the bore $f$ of the rest G, by which latter it is supported with its projecting portion, if such there be, extended through the opening $n''$. The implement is then turned axially upon the pipe or rod in the same manner as a screw-stock is turned in the operation of cutting a thread on a pipe or rod. Simultaneously with this the sleeve B, and consequently the handle C, is rotated within the bore $b$, to feed the cutter F to and against the article to be cut. This simultaneous turning of the implement around the pipe or rod to be cut, and the inward feeding of the cutter F, of course quickly severs such pipe or rod. By running the cutter F back or downward clear of the socket $a$, and removing the holder I, an ordinary screw-threading die of similar size and configuration may be placed in the socket A, and the implement, after this substitution of parts, may be used for cutting screw-threads on pipes or rods in the same manner as with the ordinary screw-threading die.

What we claim as our invention is—

1. The combination, with the square-socketed stock A, of the rotating sleeve B, the feeding-screw in the handle C, the feeding-nut D, the cutter F, the guide-slot $d'$, and the circular rest G, the whole constructed and arranged for joint operation, substantially as and for the purposes herein set forth.

2. The combination, with the square-socketed stock A and the adjustable cutter F, of the square-socketed holder I, provided with slot $d$, made in two sections, pivoted together at one side, and connected at the opposite side by the screw K working through the lugs $m$, the whole constructed and arranged for operation substantially as and for the purpose herein set forth.

GEO. P. JACOBS.
JACOB JAMER.

Witnesses:
JAMES A. WHITNEY,
H. WELLS, Jr.